(12) United States Patent
Narikawa (10) Patent No.: US 10,958,883 B2
(45) Date of Patent: Mar. 23, 2021

(54) PROJECTION CONTROL APPARATUS, PROJECTION APPARATUS, PROJECTION CONTROL METHOD, AND STORAGE MEDIUM STORING PROGRAM

(71) Applicant: CASIO COMPUTER CO., LTD., Tokyo (JP)

(72) Inventor: Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/291,723

(22) Filed: Mar. 4, 2019

(65) Prior Publication Data

US 2019/0297306 A1 Sep. 26, 2019

(30) Foreign Application Priority Data

Mar. 22, 2018 (JP) ................. 2018-055030

(51) Int. Cl.
*H04N 9/31* (2006.01)
*H04N 5/74* (2006.01)

(52) U.S. Cl.
CPC ............ *H04N 9/3182* (2013.01); *H04N 5/74* (2013.01); *H04N 9/3185* (2013.01); *H04N 9/3191* (2013.01); *H04N 9/3194* (2013.01)

(58) Field of Classification Search
CPC .. H04N 9/3194; H04N 9/3185; H04N 9/3183; H04N 9/3182; H04N 9/3191
See application file for complete search history.

(56) References Cited

U.S. PATENT DOCUMENTS

| 6,483,537 B1* | 11/2002 | Mayer, III | H04N 5/74 |
| | | | 348/180 |
| 7,018,050 B2* | 3/2006 | Ulichney | G03B 21/26 |
| | | | 345/596 |
| 7,215,362 B2* | 5/2007 | Klose | H04N 9/3147 |
| | | | 345/1.1 |

(Continued)

FOREIGN PATENT DOCUMENTS

| CN | 102457692 A | 5/2012 |
| CN | 101136192 B | 6/2013 |

(Continued)

OTHER PUBLICATIONS

Extended European Search Report (EESR) dated Jul. 18, 2019 issued in counterpart European Application No. 19161463.5.

(Continued)

*Primary Examiner* — Brian P Yenke
(74) *Attorney, Agent, or Firm* — Holtz, Holtz & Volek PC (57) ABSTRACT

A projection control apparatus includes a CPU configured to perform control to successively project a plurality of images for correction onto a projection target, each of the images for correction being configured such that a marker image is arranged at a preset position in the image, to acquire information of a plurality of photographed images including the images for correction projected onto the projection target, to detect a difference between the respective photographed images, based on positions of the marker images, and to set a correction condition for projecting an image, based on the information of the photographed images, in accordance with the detected difference of a projection image range.

16 Claims, 10 Drawing Sheets

(56) References Cited

U.S. PATENT DOCUMENTS

| | | | |
|---|---|---|---|
| 7,422,331 B2* | 9/2008 | Matsuda | G03B 21/14 |
| | | | 348/E9.027 |
| 8,355,601 B2* | 1/2013 | Ding | H04N 9/3182 |
| | | | 348/189 |
| 8,442,313 B2* | 5/2013 | Kondo | H04N 9/3194 |
| | | | 382/167 |
| 8,866,914 B2* | 10/2014 | Murase | H04N 17/02 |
| | | | 348/177 |
| 8,944,610 B2 | 2/2015 | Nakata | |
| 9,479,748 B2* | 10/2016 | Furui | H04N 9/3194 |
| 9,661,257 B2 | 5/2017 | Ishikawa et al. | |
| 9,762,869 B2* | 9/2017 | Nakashin | H04N 9/3185 |
| 9,781,396 B2* | 10/2017 | Furui | H04N 9/3182 |
| 10,044,998 B2* | 8/2018 | Takasu | H04N 9/3194 |
| 10,057,554 B2* | 8/2018 | Narikawa | H04N 9/3194 |
| 10,171,781 B2* | 1/2019 | Oka | H04N 5/35572 |
| 10,225,464 B2* | 3/2019 | Narikawa | H04N 9/3185 |
| 10,304,171 B2* | 5/2019 | Nakagawa | G09G 5/00 |
| 10,437,139 B2* | 10/2019 | Nakagawa | H04N 5/7416 |
| 10,455,204 B2* | 10/2019 | Nakajima | H04N 9/3182 |
| 2006/0181687 A1 | 8/2006 | Matsuda | |
| 2008/0062164 A1 | 3/2008 | Bassi et al. | |
| 2011/0025988 A1 | 2/2011 | Haraguchi et al. | |
| 2011/0216051 A1 | 9/2011 | Ishiyama | |
| 2012/0105813 A1 | 5/2012 | Todoroki | |
| 2012/0113399 A1 | 5/2012 | Yeom et al. | |
| 2012/0127323 A1 | 5/2012 | Kasuya et al. | |
| 2014/0063468 A1* | 3/2014 | Narikawa | H04N 9/3111 |
| | | | 353/31 |
| 2014/0333585 A1 | 11/2014 | Suzuki et al. | |
| 2015/0015852 A1* | 1/2015 | Furui | H04N 9/3194 |
| | | | 353/69 |
| 2015/0077573 A1 | 3/2015 | Ishikawa et al. | |
| 2015/0084992 A1* | 3/2015 | Wada | G06T 5/006 |
| | | | 345/647 |
| 2015/0103257 A1* | 4/2015 | Nakashin | H04N 9/3194 |
| | | | 348/746 |
| 2015/0193964 A1 | 7/2015 | Kim et al. | |
| 2015/0254819 A1* | 9/2015 | Hara | G06T 5/006 |
| | | | 345/647 |
| 2017/0223322 A1* | 8/2017 | Grundhofer | H04N 9/3185 |
| 2018/0167593 A1* | 6/2018 | Narikawa | G09G 5/00 |
| 2018/0176523 A1* | 6/2018 | Takasu | H04N 9/3111 |
| 2018/0278840 A1* | 9/2018 | Narikawa | H04N 5/23229 |
| 2018/0367770 A1* | 12/2018 | Nakagawa | G03B 17/48 |
| 2018/0373134 A1* | 12/2018 | Takahama | G03B 21/2066 |

FOREIGN PATENT DOCUMENTS

| | | |
|---|---|---|
| CN | 103313010 A | 9/2013 |
| EP | 2665277 A1 | 11/2013 |
| EP | 2802147 A2 | 11/2014 |
| JP | 2007259472 A | 10/2007 |
| JP | 2010146328 A | 7/2010 |
| JP | 2011239216 A | 11/2011 |
| JP | 2015056834 A | 3/2015 |

OTHER PUBLICATIONS

Japanese Office Action dated Nov. 12, 2019 (and English translation thereof) issued in Japanese Patent Application No. 2018-055030.
Chinese Office Action (and English language translation thereof) dated Dec. 2, 2020 issued in Chinese Application No. 201910221498.7.

* cited by examiner

FIG. 3 (TO NORMAL PROJECTION OPERATION)

PROJECTION CONTROL APPARATUS, PROJECTION APPARATUS, PROJECTION CONTROL METHOD, AND STORAGE MEDIUM STORING PROGRAM

CROSS-REFERENCE TO RELATED APPLICATIONS

This application is based upon and claims the benefit of priority from Japanese Patent Application No. 2018-055030, filed Mar. 22, 2018, the entire contents of which are incorporated herein by reference.

BACKGROUND OF THE INVENTION

1. Field of the Invention

The present invention relates to a projection control apparatus, a projection apparatus, a projection control method, and a storage medium storing a program, which are suitable to a case of projecting an image on a projection target other than a dedicated screen.

2. Description of the Related Art

There is proposed a technique for solving the problem that, in a projector that projects a color image, when a projection surface such as a wall is colored, the color is not correctly reproduced (e.g., Jpn. Pat. Appln. KOKAI Publication No. 2007-259472).

In techniques including the technique described in Jpn. Pat. Appln. KOKAI Publication No. 2007-259472, in order to exactly correct a color reproduction state in a projection range of the projector, means for acquiring color information of the image projected on the projection surface by the projector is needed (a color sensor in the case of Jpn. Pat. Appln. KOKAI Publication No. 2007-259472).

In this kind of projector, practically thinkable means for exactly acquiring color information of an image is a digital camera which the user of the projector uses. If color correction of the projector can be implemented by photographing a projection image by a general digital camera, the initial setting of the projector can be realized more easily.

However, when a projection image by the projector is photographed by the digital camera, it is necessary to successively project projection images of a plurality of patterns and to photograph the projection images, in techniques including the technique described in the above Jpn. Pat. Appln. KOKAI Publication No. 2007-259472.

If the plural projection images are photographed in the state in which the digital camera is held by the hands, the photographing position of the camera itself is not fixed, and there is concern that a camera shake occurs.

It is thus difficult to exactly detect a projection range in the successively acquired photographed images.

Accordingly, in order to implement exact photography of projection images, it is necessary to fix the digital camera by a tripod or the like, and the time and labor necessary for the initial setting increase by that much.

The present invention has been made in consideration of the above circumstances, and the object of the present invention is to provide a projection control apparatus, a projection apparatus, a projection method, and a program, which are capable of executing, as easily as possible, the initial setting in the case of projecting an image on a projection target other than a dedicated screen.

SUMMARY OF THE INVENTION

According to one aspect of the present invention, there is provided a projection control apparatus comprising: a first communication unit configured to communicate with a projection unit; a second communication unit configured to communicate with an imaging unit; and a CPU, the CPU being configured to perform control: to successively project, by the projection unit via the first communication unit, a plurality of images for correction onto a projection target, each of the images for correction being configured such that a marker image is arranged at a preset position in the image; to acquire, from the imaging unit via the second communication unit, information of a plurality of photographed images including the images for correction projected onto the projection target; to detect a difference between the respective photographed images, based on positions of the marker images in the acquired information of the photographed images; to set a correction condition for projecting an image, based on the information of the photographed images, in accordance with the detected difference of a projection image range; and to project an image by the projection unit via the first communication unit, based on the set correction condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment in a case where the present invention is applied to a projector apparatus will be described in detail with reference to the accompanying drawings.

[Configuration]

Figure 1:
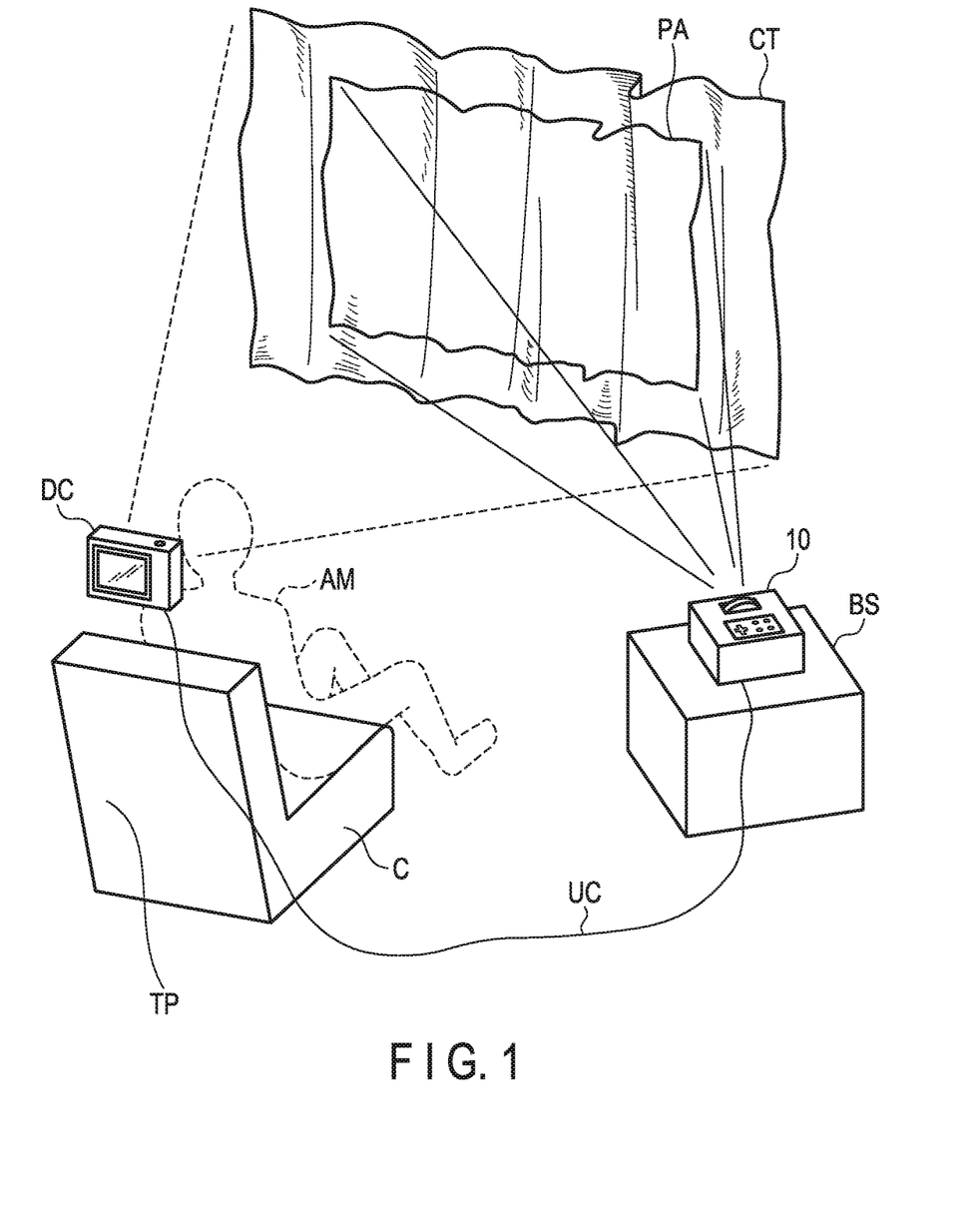
FIG. 1 is a view illustrating a setting environment of a projection range according to an embodiment of the present invention.

FIG. 1 is a view exemplifying an environment at the time of initial setting of a projection range, which is executed when a projector apparatus 10 according to the embodiment is installed.

FIG. 1 illustrates a state in which the projector apparatus 10 is placed on a stand BS, and a test rectangular image is projected toward a curtain CT as a substitute for a screen from a position shifted from the front or a position offset rightward with respect to the curtain CT in FIG. 1.

The curtain CT is folded in a wave shape and used. Even in the state illustrated in FIG. 1 in which the curtain CT is used as a projection target, the surface of the curtain CT largely waves mainly in the horizontal direction.

FIG. 1 illustrates a state in which a projection range PA of the projector apparatus 10 has an indefinite shape conforming to the surface shape of the curtain CT.

On the other hand, a chair C is installed in front of the curtain CT.

Furthermore, instead of a viewer AM who is to sit on the chair C, a setting person (not illustrated) holds a digital camera DC (imaging unit) by the hands at a position as close as possible to the positions of the two eyes of the viewer AM.

Specifically, the digital camera DC is held by the setting person in order to recognize the projection range PA on the curtain CT, which is seen from the two eyes of the viewer AM.

The digital camera DC and the projector apparatus 10 are connected by wire, for example, by a USB (Universal Serial Bus) cable UC (second communication unit).

The digital camera DC photographs an image including the curtain CT and the projection range PA on the curtain CT in accordance with a control command that is input from the projector apparatus 10 via the USB cable UC, and sends image data captured by the photographing to the projector apparatus 10 via the USB cable UC.

Figure 2:
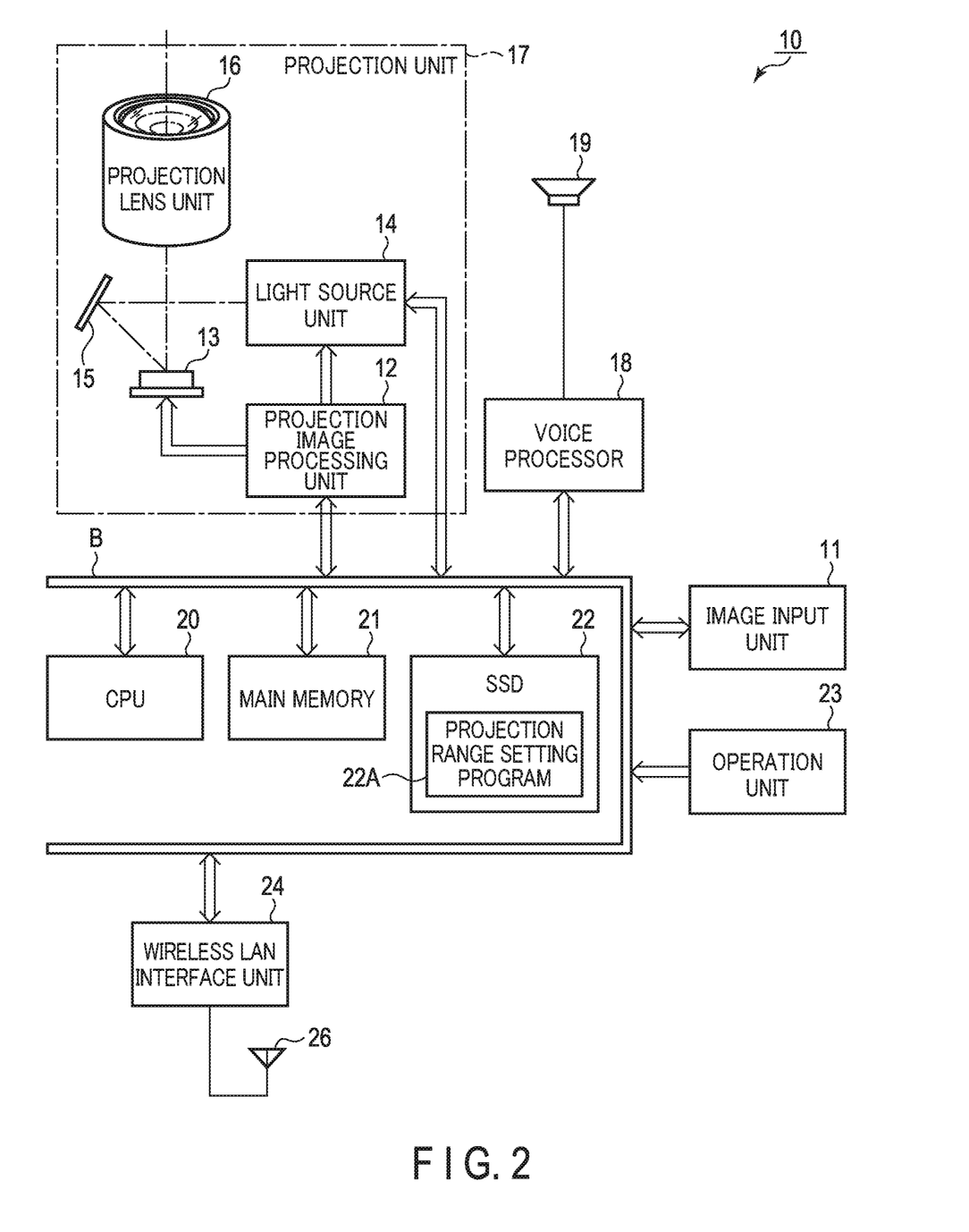
FIG. 2 is a block diagram illustrating a functional configuration of electronic circuitry of a projector apparatus according to the embodiment.

Next, referring to FIG. 2, the functional configuration of electronic circuitry of the projector apparatus 10 will mainly be described.

In FIG. 2, an image input unit 11 (second communication unit) is formed by, for example, a video input terminal of a pin jack (RCA) type, an RGB input terminal of a D-sub15 type, an HDMI® (High-Definition Multimedia Interface) terminal, a USB terminal, and the like.

Analog or digital image signals based on various kinds of standards, which are input to the image input unit 11 or which are stored in a USB memory (not illustrated) connected to the USB terminal and selectively read out, are digitized by the image input unit 11 as needed, and then sent to a projection image processing unit 12 via a bus B.

In accordance with the sent image data, the projection image processing unit 12 performs display driving of a micromirror element 13 serving as a display element by higher-speed time division driving implemented by multiplying a frame rate complying with a predetermined format, for example, 120 [frames/sec] that is twice a frame rate of 60 [frames/sec] of the input image data by the division number of color components and a display gradation number.

The micromirror element 13 performs a display operation by quickly turning on/off each of the tilt angles of a plurality of arrayed micromirrors, for example, for 1,280 pixels in the horizontal direction×800 pixels in the vertical direction corresponding to WXGA, thereby forming an optical image using the reflected light.

On the other hand, a light source unit 14 cyclically, time-divisionally emits primary color light beams of R, G, and B.

The light source unit 14 includes an LED as a semiconductor light-emitting element, and repeatedly, time-divisionally emits the primary color light beams of R, G, and B.

The LED of the light source unit 14 may include an LD (semiconductor laser) or organic EL element, as an LED in a wide sense.

The primary color light from the light source unit 14 is totally reflected by a mirror 15, and the micromirror element 13 is irradiated with the light.

An optical image is formed by the light reflected by the micromirror element 13, and then projected and displayed outside via a projection lens unit 16.

The projection image processing unit 12, the micromirror element 13, the light source unit 14, the mirror 15, and the projection lens unit 16 form a projection unit 17.

If the image signals input from the image input unit 11 include a sound signal, the sound signal is separated from the image signals by the image input unit 11, and sent to a sound processing unit 18 via the bus B.

The sound processing unit 18 includes a sound source circuit such as a PCM sound source, and converts, into an analog signal, a sound signal provided at the time of a projection operation, and drives a speaker 19 to output a sound or generate a beep sound or the like, as needed.

A CPU 20 controls all of the operations of the above-described circuits.

The CPU 20 is connected to a main memory 21 and an SSD (Solid State Drive) 22.

The main memory 21 is formed by, for example, an SRAM, and functions as a work memory for the CPU 20.

The SSD 22 is formed by an electrically rewritable nonvolatile memory, for example, a flash ROM, and stores various operation programs including a projection range setting program 22A (to be described later) that is executed by the CPU 20, data of test pattern images (to be described later), various kinds of standard data such as an OSD (On Screen Display) image to be superimposed on a base image, and the like.

The CPU 20 reads out the operation programs, the standard data, and the like stored in the SSD 22, loads and stores them in the main memory 21, and executes the programs, thereby comprehensively controlling the projector apparatus 10.

The CPU 20 executes various projection operations in accordance with operation signals from an operation unit 23 via the bus B.

This operation unit 23 includes operation keys provided on the body housing of the projector apparatus 10, or a light receiving unit that receives an infrared modulation signal from a remote controller (not illustrated) dedicated to the projector apparatus 10, and accepts a key operation signal and sends a signal corresponding to the accepted key operation signal to the CPU 20 via the bus B.

The CPU 20 is also connected to a wireless LAN interface unit 24 via the bus B.

The wireless LAN interface unit 24 transmits/receives data to/from an external device by wireless communication connection complying with, for example, the IEEE802.11a/11b/11g/11n/11ac standard via a wireless LAN antenna 26.

In addition, the CPU 20 controls the projection unit 17 via the bus B (first communication unit).

[Operation]

Next, an operation example of the embodiment will be described.

With reference to the accompanying drawings, a description is given of an operation in the case in which, as initial settings before starting the projection of a freely chosen image by the projector apparatus 10, a setting process using the projector apparatus 10 and digital camera DC is executed as illustrated in FIG. 1, and the projector apparatus 10 is set in accordance with the states of the shape and color distribution of the curtain CT.

Figure 3:
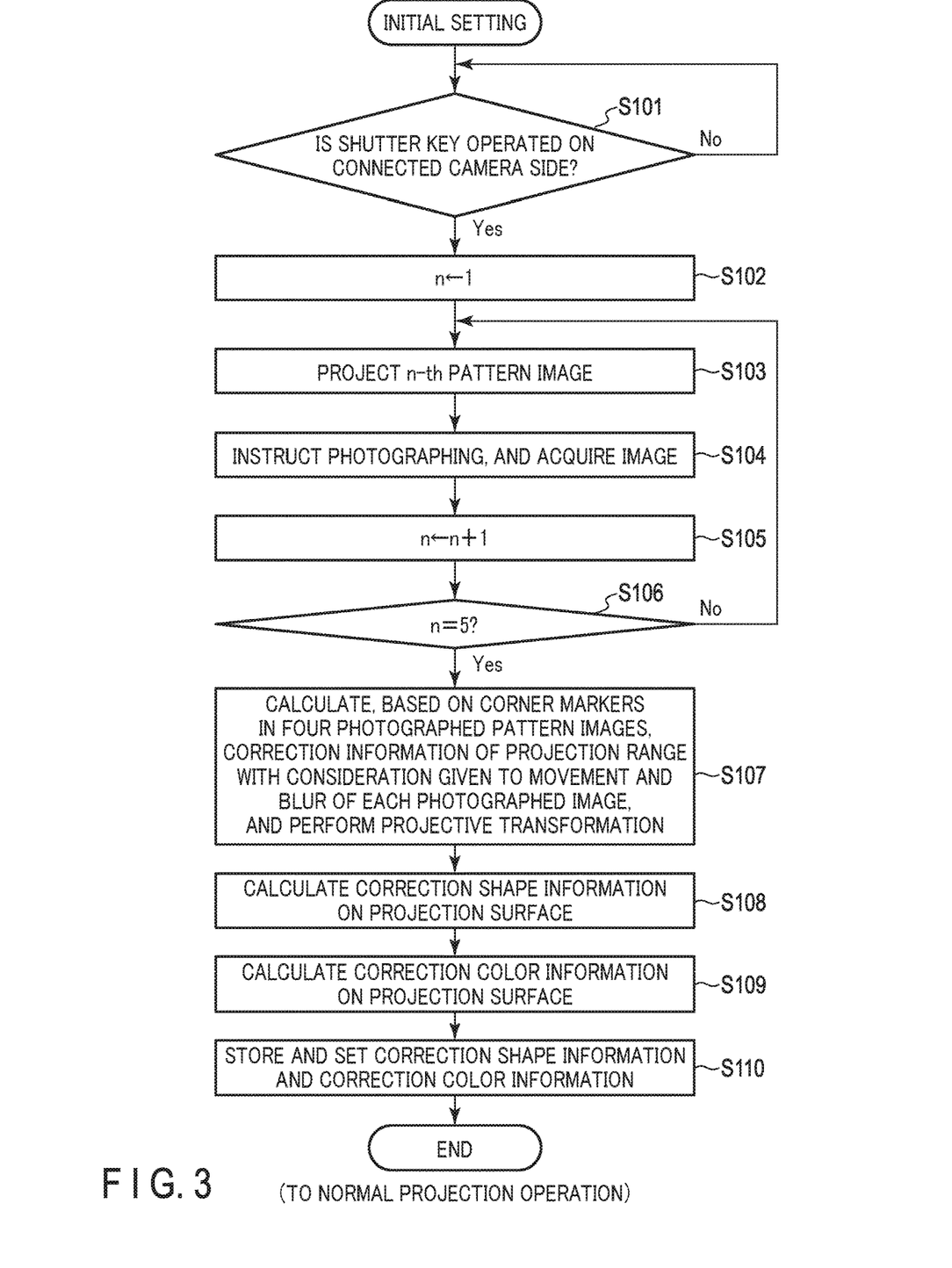
FIG. 3 is a flowchart illustrating processing contents at the time of initial setting according to the embodiment.

FIG. 3 illustrates processing contents at the time of the initial setting of the projector apparatus 10 by the CPU 20, according to the projection range setting program 22A stored in the SSD 22.

At the beginning of the process, the CPU 20 stands by for an instruction to start the process, by repeatedly determining whether a signal by the operation of the shutter key, which instructs the start of the setting process, has been input from the digital camera DC held by the hands of the setting person, the digital camera DC being connected to the projector apparatus 10 via the USB cable UC (step S101).

In step S101, when it is determined that the signal by the operation of the shutter key has been input from the digital camera DC (Yes in step S101), the CPU 20 sets an initial value "1" to a variable i for designating a test pattern image (step S102).

Subsequently, the CPU 20 reads out data of a first test pattern image from the SSD 22 in accordance with the value "1" of the variable i, and projects the first test pattern image by the projection unit 17 (step S103).

Figure 4A:
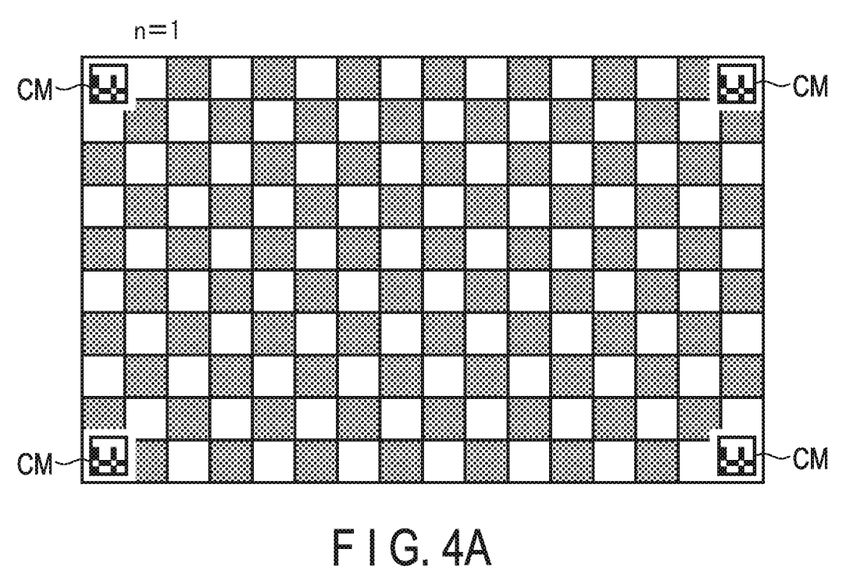
FIG. 4A and FIG. 4B are views exemplifying test pattern images according to the embodiment.

FIG. 4A is a view exemplifying the first test pattern image which is read out from the SSD 22 at this time, and is projected onto the curtain CT by the projection unit 17.

The first test pattern image is an image of a rectangular checkerboard pattern. Two-dimensional bar-code-shaped corner markers CM each having directivity are arranged in the same direction at the four corners of the rectangular image. On the other hand, in the most part of the image, white rectangles with maximum luminances of RGB primary color components and black rectangles with minimum luminances of RGB primary color components are alternately arranged in a two-dimensional plane in a checkerboard pattern.

The shape of the projection image on the curtain CT that is the projection target can be measured by xy coordinate values in a photographed image of intersection portions at which the white rectangles and black rectangles intersect in FIG. 4A.

In the state in which the first test pattern image is projected, a signal to instruct photographing is sent to the digital camera DC via the image input unit 11 and USB cable UC, and photographed image data, which is captured by the photographing and is assumed to include the projection range PA on the curtain CT, is acquired from the digital camera DC and is held (step S104).

Next, the value of variable i is updated by "+1" and set to "2" (step S105).

Confirming that the updated value does not reach a value "5" that is greater than the total number of one set of test pattern images stored in the SSD 22 (No in step S106), the CPU 20 returns to the process from step S103.

By repeatedly executing the process of steps S103 to S106 in this manner, second to fourth test pattern images are successively projected and the photographed image data indicative of the respective projection states are successively acquired, like the projection and photographing process of the first test pattern image.

Figure 4B:
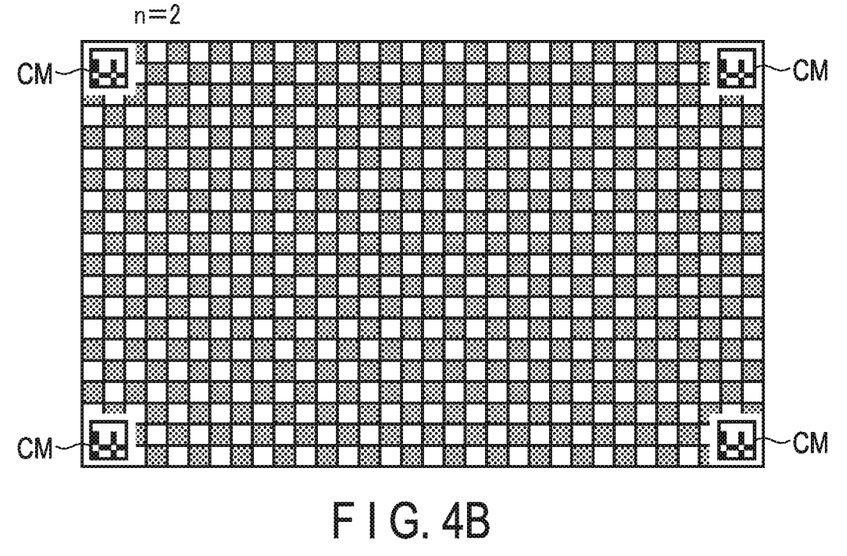

FIG. 4B is a view exemplifying the second test pattern image.

The second test pattern image is a pair to the test pattern image of FIG. 4A, and is mainly used to measure the shape of the projection image on the curtain CT that is the projection target.

The second test pattern image is similar to the test pattern image illustrated in FIG. 4A, with respect to the arrangement of the corner markers CM at the four corners. However, the second test pattern image is an image of a finely set checkerboard pattern with a smaller pitch of rectangles. Thereby, the cycle width in each of the three coordinate directions of intersection portions, at which the white rectangles and black rectangles intersect, is narrowed, and the shapes, such as undulations and irregularities, of the projection range PA on the curtain CT, can be detected more finely.

Figure 5A:
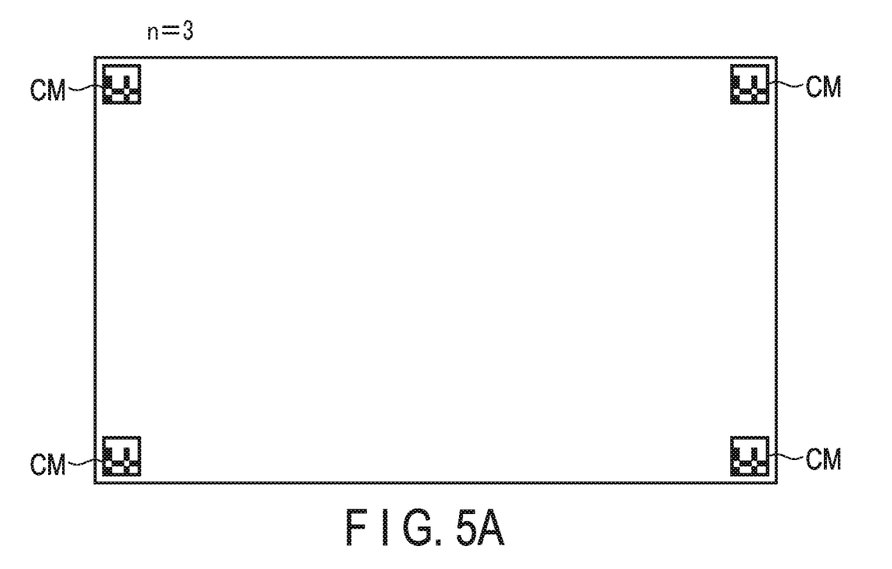
FIG. 5A and FIG. 5B are views exemplifying test pattern images according to the embodiment.

FIG. 5A is a view exemplifying the third test pattern image.

Two-dimensional bar-code-shaped corner markers CM each having directivity are arranged in the same direction at the four corners of the rectangular image. On the other hand, the other part of the image is a white image with maximum luminances of RGB primary color components on the entire area.

By acquiring a distribution of color components of the photographed image in the white part, the information of the color distribution corresponding to the pattern of the curtain CT in the projection range PA can be acquired.

Figure 5B:
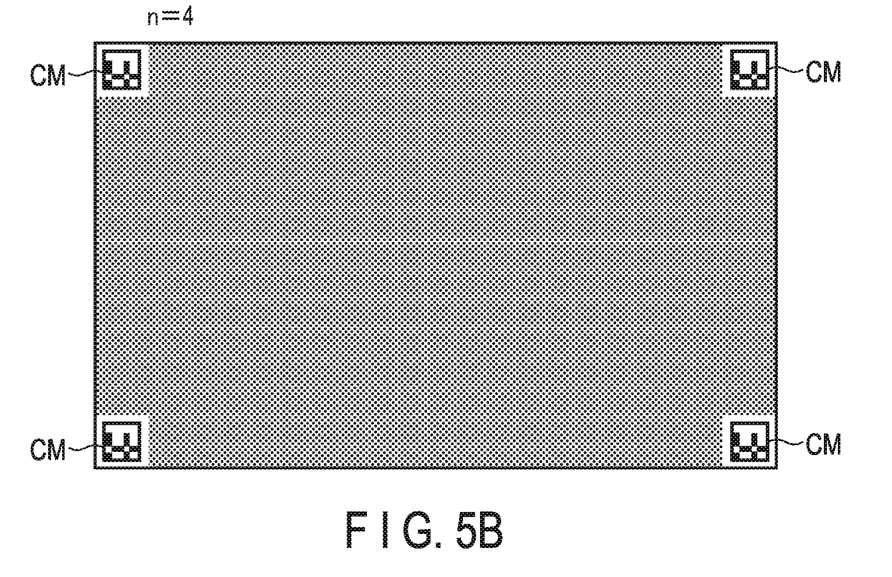

FIG. 5B is a view exemplifying the fourth test pattern image.

The fourth test pattern image is a pair to the test pattern image of FIG. 5A, and is mainly used to measure the color distribution of the projection image on the curtain CT that is the projection target.

The fourth test pattern image is similar to the test pattern image illustrated in FIG. 5A, with respect to the arrangement of the corner markers CM at the four corners. However, the other part of the fourth test pattern image is a black image with minimum luminances of RGB primary color components on the entire area.

As regards the process necessary for the projection of the above-described four test pattern images and the photography of these images projected on the projection range PA on the curtain CT, it is assumed that, for example, the projection and photography for one test pattern image are completed in about 0.2 [sec], and even the process for the four test pattern images is completed in less than one [sec].

In general, a camera shake has a cycle corresponding to a frequency of about 10 [Hz]. By performing photography while holding the digital camera CD by the hands as described above, there is a possibility that a movement and blur will occur between the respective acquired photographed image data.

It was ascertained by actual measurement that, for example, when the projection unit 17 projects an image of the resolution of WXGA (1,280 dots in the horizontal direction×800 dots in the vertical direction) as described above, if photography is performed with the above-described time difference of about 0.2 [sec], the amount of blur due to parallel movement and camera shaking of the projection range PA in the photographed image is about 40 dots.

After acquiring the photographed image data corresponding to the four test pattern data, the value "4" of the variable i at this time point is updated by "+1" and set to "5" in step S105.

In subsequent step S106, if it is determined that the value of the variable i has changed to "5" (Yes in step S106), the CPU 20 extracts the corner marker CM portions from the respective acquired photographed image data, in which the four test pattern images are projected, by a pattern recognition process, and represents the corner marker CM portions by coordinates. Thereby, correction information of the projection range PA part is calculated with consideration given to the movement (parallel movement) and blur of the projection range PA in each photographed image. By the projective transformation based on the calculated correction information, such image information that the corner markers CM at the four corners are set in the same position (step S107).

In this case, for example, the coordinate range of the projection range PA in the photographed image data corresponding to the first test pattern image is used as a base range, and the projective transformation is executed for the photographed image data corresponding to the second test pattern image.

Similarly, as regards the third and fourth test pattern images, the projective transformation is executed by using, as a base range, the coordinate range of the projection range PA in the photographed image data corresponding to the first test pattern image.

Based on the projection range PA part in the photographed image data corresponding to the first test pattern image and the projection range PA part in the projective-transformed photographed image data corresponding to the second test pattern image, the CPU 20 calculates correction shape information of an image that is projected by the projection unit 17, so that the projected image may have an exact rectangular shape when viewed from the positions of the two eyes of the viewer AM (step S108).

Next, based on the projection range PA parts in the photographed image data corresponding to the third and fourth test pattern images, which are also projective-transformed, the CPU 20 calculates correction color information on a dot-by-dot basis of the image that is projected by the projection unit 17, so that the color distribution may become an exact color distribution when viewed from the positions of the two eyes of the viewer AM (step S109).

Then, the CPU 20 stores in the main memory 21 the correction shape information and correction color information of the projection image, which were calculated in steps S108 and S109, and sets the correction shape information and correction color information in the projection image processing unit 12 of the projection unit 17 as the information to be used in a subsequent normal projection operation (step S110). Thus, the initial setting process illustrated in FIG. 3 is ended.

In the description of FIG. 4A, FIG. 4B, FIG. 5A and FIG. 5B, it is assumed that the test pattern image, in which the corner markers CM of the same pattern and same direction are arranged at the four corners, is projected. However, corner markers CM, which are different with respect to at least one of the pattern and direction between their positions, may be arranged at the four corners of the test pattern image.

In this case, even when the projector apparatus 10 is vertically installed by being rotated over 90° such that either the left or the right of the housing is located upward, or when the projector apparatus 10 is invertedly installed on the ceiling by being rotated over 180° and fixed by a ceiling suspension metal fitting, the state of installation can be determined from photographed images captured by the digital camera DC, and it becomes possible to adapt to subsequent projection operations.

It is not always necessary to arrange the corner markers CM at the four corners of the test pattern image. The corner markers CM can be similarly implemented, for example, in cases where corner markers are arranged at two diagonal locations of an upper left end and a lower right end of the test pattern image, or a center marker, instead of the corner markers arranged at the corners of the rectangular image, is disposed at only one location at the center of the test pattern image.

Further, in the description of FIG. 4A and FIG. 4B, the two test pattern images of checkerboard patterns with greatly different pitches are used. However, in the case of, in particular, a test pattern image with a fine pitch, it is thinkable that the detection of intersection portions of an extremely small pitch is difficult.

Figure 6A:
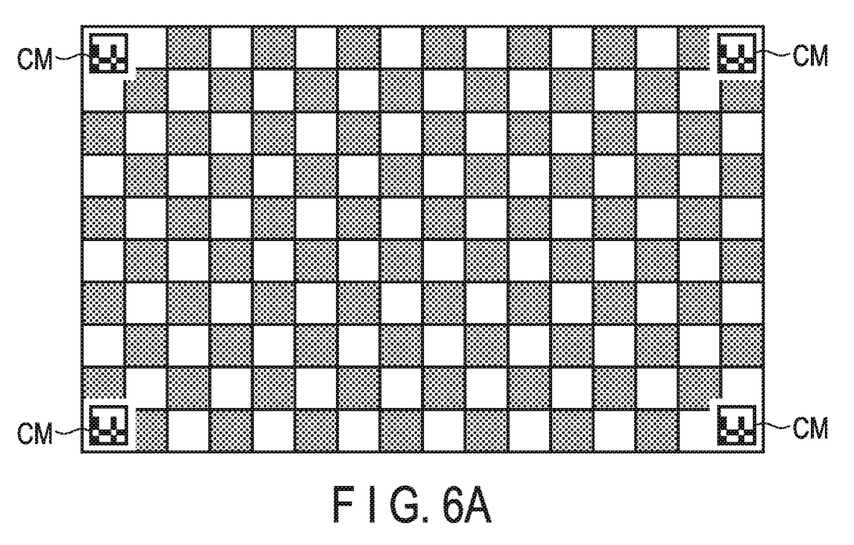
FIG. 6A and FIG. 6B are views exemplifying other test pattern images according to the embodiment.
Figure 6B:
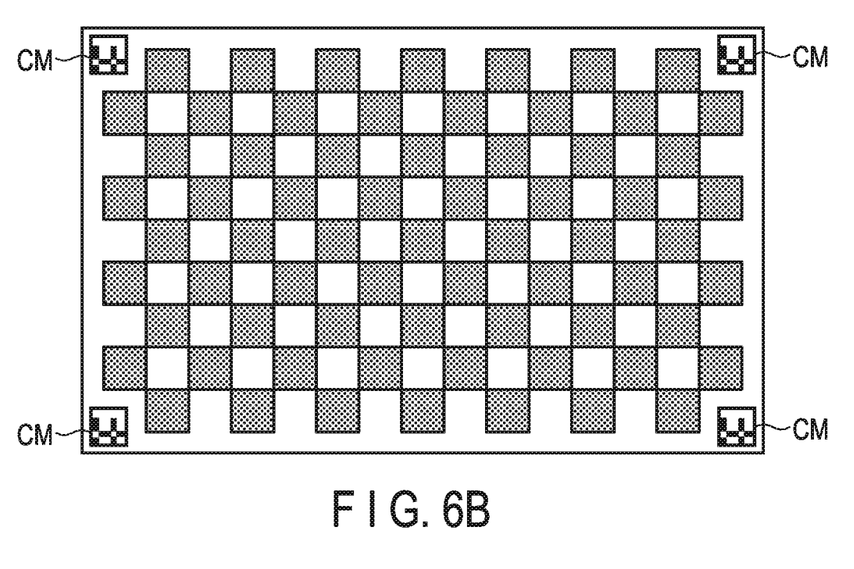

FIG. 6A and FIG. 6B exemplify a set of other test pattern images, which are prepared in consideration of the above case.

FIG. 6A is the same test pattern image as in FIG. 4A.

On the other hand, as illustrated in FIG. 6B, in place of the test pattern image of FIG. 4B, use is made of a test pattern image of a checkerboard pattern which has the same pitch as in FIG. 4A and FIG. 6A and is displaced by a ½ pitch in the vertical and horizontal directions from the test pattern image of FIG. 4A and FIG. 6A. Thereby, the shape in the projection range PA of the curtain CT can be more finely detected so as to perform interpolation between the intersection positions obtained in FIG. 4A and FIG. 6A.

Figure 7:
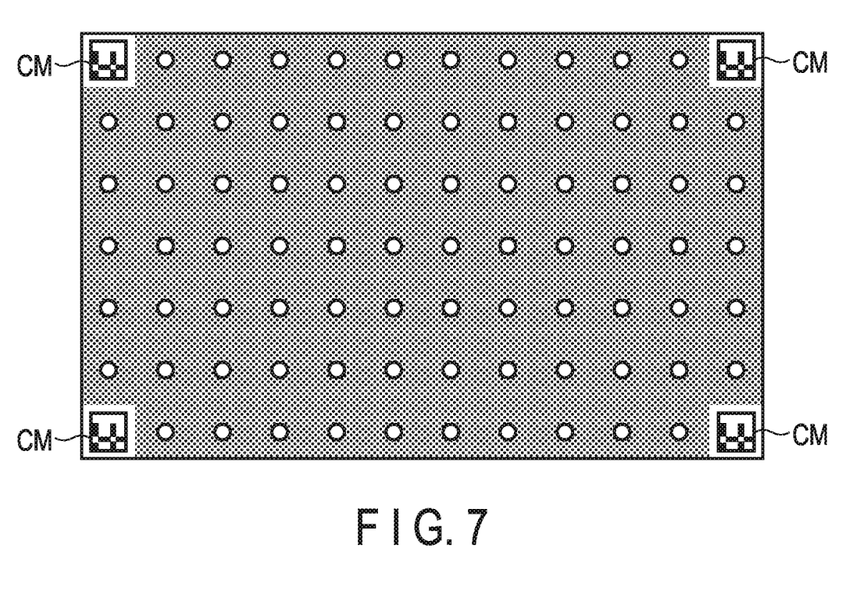
FIG. 7 is a view exemplifying another test pattern image according to the embodiment.

Further, FIG. 7 exemplifies a test pattern image in which many white circles are arranged in a matrix on a black background, this test pattern image being substituted for the test pattern images of checkerboard patterns illustrated in FIG. 4A, FIG. 4B, FIG. 6A and FIG. 6B.

By using this test pattern image, detection of light/dark boundary portions becomes easier.

Besides, in the above description, in order to detect the color distribution of the projection range PA part of the curtain CT that is the projection target, the test pattern image that is white in all area and the test pattern image that is black in all area, which are illustrated in FIG. 5A and FIG. 5B, are used. In particular, when the reproduction precision of colors is to be enhanced, it is possible to make such correction that the projection range PA part in the photographed image may have a target color gradation, by projecting test pattern images each having a single color in all area with respect to each of the RGB primary color components.

Conversely, when the objective is to shorten the time needed for the initial setting, only the test pattern image that is white in all area, which is illustrated in FIG. 5A, may be projected with respect to the color correction, and this projected image may be photographed.

[Other Operation]

Next, another operation example of the embodiment will be described.

Referring to the drawings, a description is given of another operation in the case in which, as the initial settings before starting projection of a freely chosen image by the projector apparatus 10, the setting process is executed by using the projector apparatus 10 and digital camera DC as illustrated in FIG. 1, and the projector apparatus 10 is set in accordance with the states of the shape and color distribution of the curtain CT.

In the present operation example, it is assumed that the SSD 22 prestores, in addition to the data of the test pattern images described in FIG. 4A, FIG. 4B, FIG. 5A and FIG. 5B, other test pattern images of a different system in which positions of markers in the images are different from those of the corner markers CM.

Figure 8:
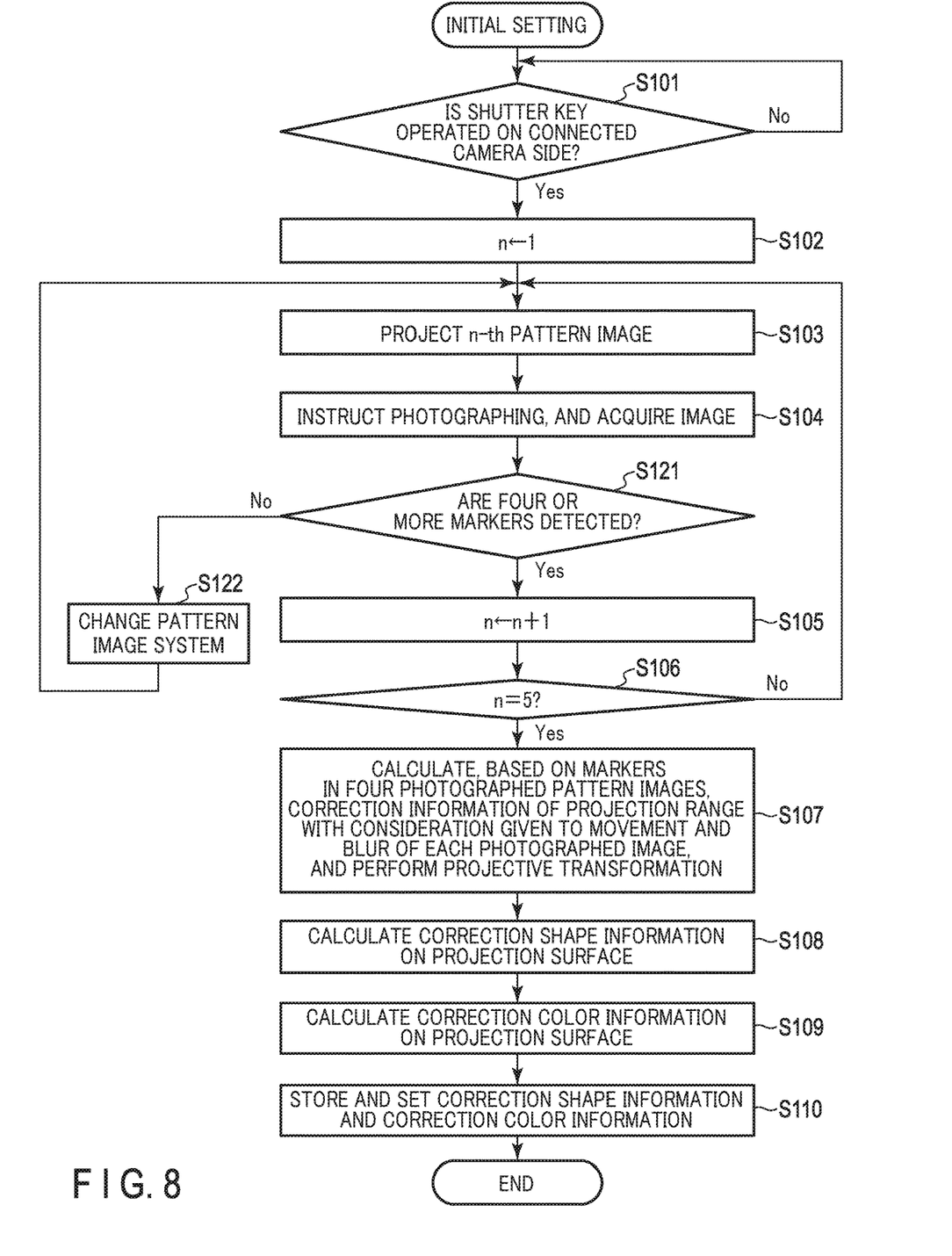
FIG. 8 is a flowchart illustrating other processing contents at the time of initial setting according to the embodiment.

FIG. 8 illustrates processing contents at the time of the initial setting of the projector apparatus 10 by the CPU 20, according to the projection range setting program 22A stored in the SSD 22.

At the beginning of the process, the CPU 20 stands by for an instruction to start the process, by repeatedly determining whether a signal by the operation of the shutter key, which instructs the start of the setting process, has been input from the digital camera DC held by the hands of the setting person, the digital camera DC being connected to the projector apparatus 10 via the USB cable UC (step S101).

In step S101, when it is determined that the signal by the operation of the shutter key has been input from the digital camera DC (Yes in step S101), the CPU 20 sets an initial value "1" to a variable i for designating a test pattern image (step S102).

Subsequently, the CPU 20 reads out data of a first test pattern image from the SSD 22 in accordance with the value "1" of the variable i, and projects the first test pattern image by the projection unit 17 (step S103).

FIG. 4A is a view exemplifying the first test pattern image which is read out from the SSD 22 at this time, and is projected onto the curtain CT by the projection unit 17.

As described above, the corner markers CM are arranged in the same direction at the four corners of the rectangular image.

In the state in which the first test pattern image is projected, a signal to instruct photographing is sent to the digital camera DC via the image input unit 11 and USB cable UC, and photographed image data, which is captured by the photographing and is assumed to include the projection range PA on the curtain CT, is acquired from the digital camera DC and is held (step S104).

Here, the CPU 20 determines whether a partial shadow or the like occurs in the projection range PA on the curtain CT as viewed from the digital camera DC, by determining whether four or more marker images are included in the acquired image (step S121).

When it is determined that the number of marker images in the acquired image is less than four and that a partial shadow or the like occurs in the projection range PA on the curtain CT as viewed from the digital camera DC (No in step S121), the CPU 20 changes the system of test pattern images (step S122) and returns to the process from step S103.

Figure 9A:
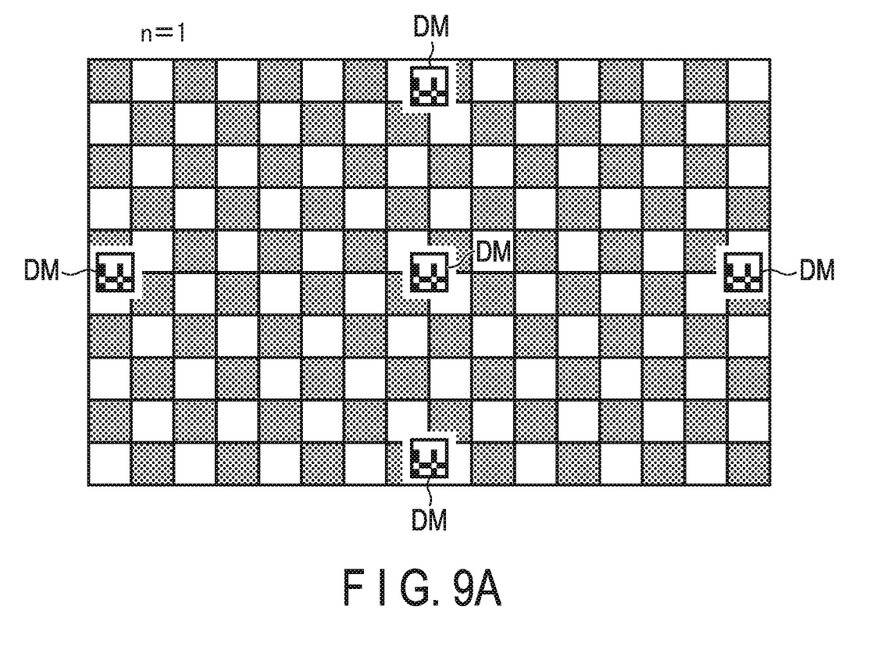
FIG. 9A and FIG. 9B are views exemplifying other test pattern images according to the embodiment.

FIG. 9A is a view exemplifying a first test pattern image of a different system, which is read out from the SSD 22 at this time in step S103, and is projected onto the curtain CT by the projection unit 17.

The first test pattern image of the different system is an image of a rectangular checkerboard pattern. Two-dimensional bar-code-shaped distinction markers DM each having directivity are arranged in the same direction at five locations in total, i.e., centers of upper, lower, left and right sides of the rectangular image, and a center of the image. On the other hand, in the most part of the image, white rectangles with maximum luminances of RGB primary color components and black rectangles with minimum luminances of RGB primary color components are alternately arranged in a two-dimensional plane in a checkerboard pattern.

The pattern itself of each distinction marker DM is the same as the pattern of each corner marker CM illustrated in FIG. 4A, FIG. 4B, FIG. 5A, FIG. 5B, FIG. 6A, FIG. 6B and FIG. 7, and the positions of the distinction markers DM are different from those of the corner markers CM.

The shape of the projection image on the curtain CT that is the projection target can be measured by xy coordinate values in the photographed image of the intersection portions at which the white rectangles and black rectangles intersect in FIG. 9A.

In the state in which the first test pattern image of the different system is projected, a signal to instruct photographing is sent to the digital camera DC in step S104, and photographed image data, which is captured by the photographing and is assumed to include the projection range PA on the curtain CT, is acquired from the digital camera DC and is held.

The CPU 20 determines whether a partial shadow or the like occurs in the projection range PA on the curtain CT as viewed from the digital camera DC, by determining, once again, whether four or more marker images are included in the acquired image (step S121).

If it is determined that four or more marker images are included in the acquired image (Yes in step S121), the CPU 20 updates the value of the variable i by "+1" and sets the value to "2" (step S105).

Confirming that the updated value does not reach a value "5" that is greater than the total number of one set of test pattern images stored in the SSD 22 (No in step S106), the CPU 20 returns to the process from step S103.

By repeatedly executing the process of steps S103 to S106 in this manner, second to fourth test pattern images of the different system are successively projected and the photographed image data indicative of the respective projection states are successively acquired, like the projection and photography process of the first test pattern image of the different system.

Figure 9B:
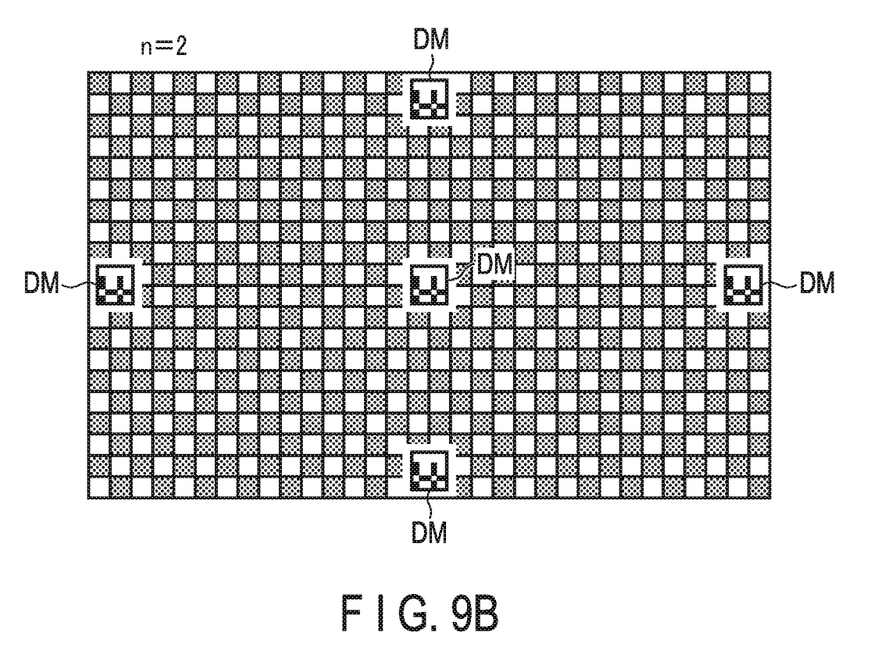

FIG. 9B is a view exemplifying the second test pattern image of the different system.

The second test pattern image of the different system is a pair to the test pattern image of FIG. 9A, and is mainly used to measure the shape of the projection image on the curtain CT that is the projection target.

The second test pattern image of the different system is similar to the test pattern image illustrated in FIG. 9A, with respect to the arrangement of the distinction markers DM at the five corners. However, the second test pattern image of the different system is an image of a finely set checkerboard pattern with a smaller pitch of rectangles, and the cycle width in each of the three coordinate directions of intersection portions, at which the white rectangles and black rectangles intersect, is narrowed. Thereby, the shapes, such as undulations and irregularities, of the projection range PA on the curtain CT, can be detected more finely.

Figure 10A:
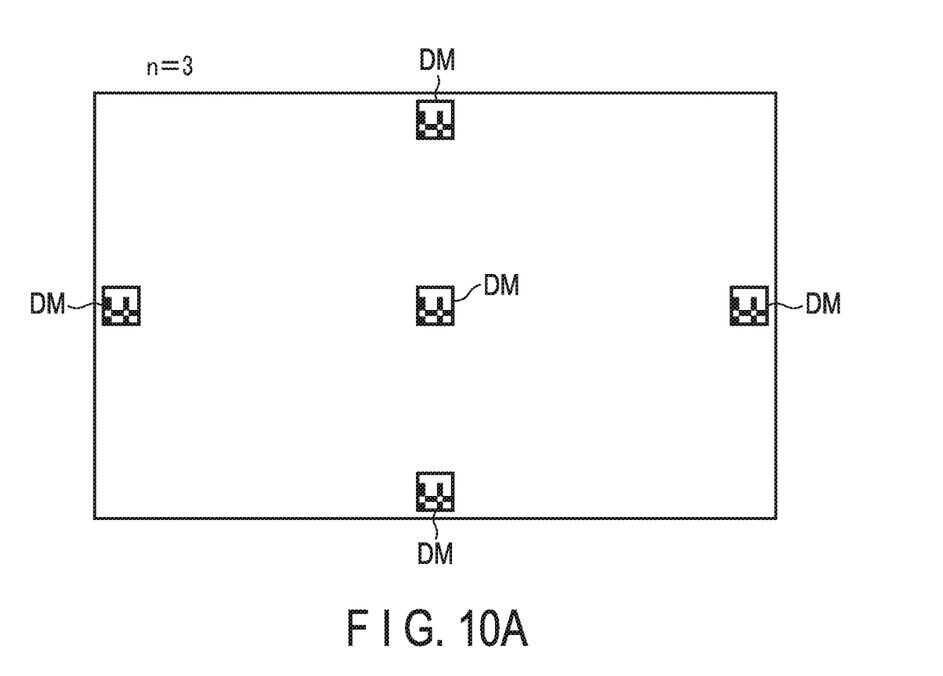
FIG. 10A and FIG. 10B are views exemplifying other test pattern images according to the embodiment.

FIG. 10A is a view exemplifying the third test pattern image of the different system.

Two-dimensional bar-code-shaped distinction markers DM each having directivity are arranged in the same direction at five locations in total, i.e., centers of upper, lower, left and right sides of the rectangular image, and a center of the image. On the other hand, the other part of the image is a white image with maximum luminances of RGB primary color components on the entire area.

By acquiring a distribution of color components of the photographed image in the white part, the information of the color distribution corresponding to the pattern of the curtain CT in the projection range PA can be acquired.

Figure 10B:
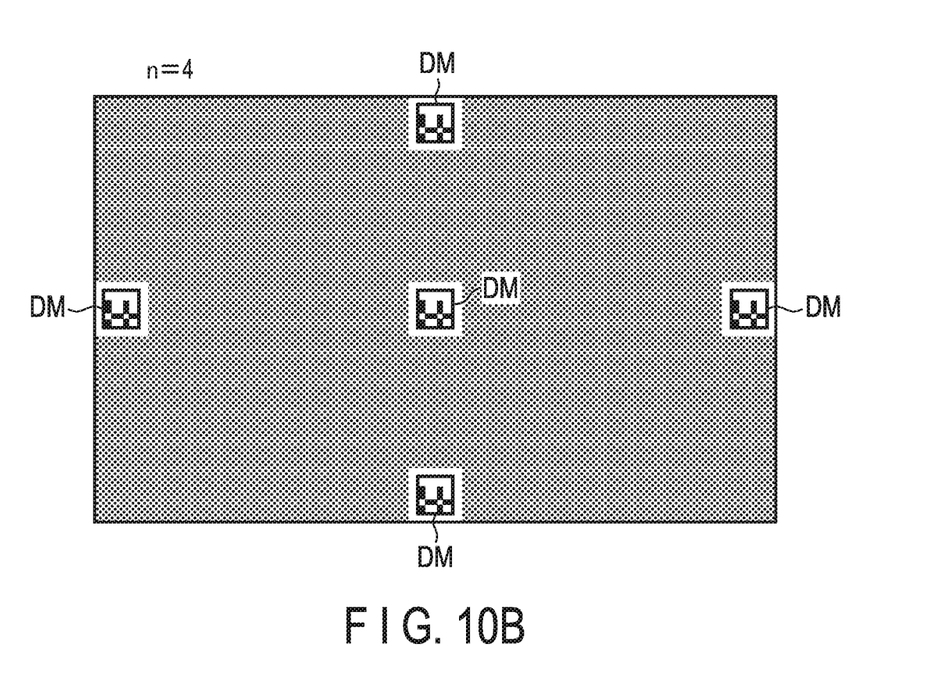

FIG. 10B is a view exemplifying the fourth test pattern image of the different system.

The fourth test pattern image of the different system is a pair to the test pattern image of FIG. 10A, and is mainly used to measure the color distribution of the projection image on the curtain CT that is the projection target.

The fourth test pattern image of the different system is similar to the test pattern image illustrated in FIG. 10A, with respect to the arrangement of the distinction markers DM at the five locations. However, the other part of the fourth test pattern image is a black image with minimum luminances of RGB primary color components on the entire area.

As regards the process necessary for the projection of the above-described four test pattern images of the different system and the photography of these images projected on the projection range PA on the curtain CT, it is assumed that, for example, the projection and photography for one test pattern image are completed in about 0.2 [sec], and even the process for the four test pattern images is completed in less than one [sec].

In general, a camera shake has a cycle corresponding to a frequency of about 10 [Hz]. By performing photography while holding the digital camera CD by the hands as described above, there is a possibility that a movement and blur will occur between the acquired photographed image data.

It was ascertained by actual measurement that, for example, when the projection unit 17 projects the image of the resolution of WXGA (1,280 dots in the horizontal direction×800 dots in the vertical direction) as described above, if photography is performed with the above-described time difference of about 0.2 [sec], the amount of blur due to parallel movement and camera shaking of the projection range PA in the photographed image is about 40 dots.

After acquiring the photographed image data corresponding to the four test pattern data of the different system, the value "4" of the variable i at this time point is updated by "+1" and set to "5" in step S105.

In subsequent step S106, if it is determined that the value of the variable i has changed to "5" (Yes in step S106), the CPU 20 extracts the distinction marker DM portions from the respective acquired photographed image data, in which the four test pattern images of the different system are projected, by a pattern recognition process, and represents the distinction marker DM portions by coordinates. Since at least four distinction markers DM were successfully detected, even if there is a part of a partial shadow or the like, this is recognized, and correction information of the projection range PA part is calculated with consideration given to the movement (parallel movement) and blur of the projection range PA in each photographed image. By the projective transformation based on the calculated correction information, such image information that the distinction markers DM at least at the four corners are set in the same position (step S107).

In addition, if there is a part of a shadow or the like in the projection range PA, the CPU 20 recognizes the positional range of this part.

In this case, for example, the coordinate range of the projection range PA in the photographed image data corresponding to the first test pattern image is used as a base range, and the projective transformation is executed for the photographed image data corresponding to the second test pattern image.

Similarly, as regards the third and fourth test pattern images, the projective transformation is executed by using, as a base range, the coordinate range of the projection range PA in the photographed image data corresponding to the first test pattern image.

Based on the projection range PA part in the photographed image data corresponding to the first test pattern image and the projection range PA part in the projective-transformed photographed image data corresponding to the second test pattern image, the CPU 20 calculates correction shape information of the image that is projected by the projection unit 17, so that the projected image may have an exact rectangular shape when viewed from the positions of the two eyes of the viewer AM (step S108).

Next, based on the projection range PA parts in the photographed image data corresponding to the third and fourth test pattern images, which are also projective-transformed, the CPU 20 calculates correction color information on a dot-by-dot basis of the image that is projected by the projection unit 17, so that the color distribution may become an exact color distribution when viewed from the positions of the two eyes of the viewer AM (step S109).

Then, the CPU 20 stores in the main memory 21 the correction shape information and correction color information of the projection image, which were calculated in steps S108 and S109, and sets the correction shape information and correction color information in the projection image processing unit 12 of the projection unit 17 as the information to be used in a subsequent normal projection operation (step S110). Thus, the initial setting process illustrated in FIG. 8 is ended.

In other operations, the SSD 22 stores the data of test pattern images of a plurality of systems. When a part of the range of the projection image is missing due to a shadow or the like, and a part of the marker image for distinction cannot be detected, the test pattern image is changed to a test pattern image of a different system in which the arrangement of marker images for distinction is different, and the setting is continued. Thus, in particular, in a projection environment in which an image is projected onto a projection target with irregularities such as a curtain, and the projection image is viewed from a direction different from the direction in which the projection apparatus exists, the initial setting can exactly be executed.

Advantageous Effects of the Embodiment

As described above in detail, according to the embodiment, the initial setting in the case of projecting an image on a projection target, other than a dedicated screen, which has irregularities and a pattern on the surface, can easily be executed by using the digital camera DC which is held by the hands.

In the above embodiment, since the corner markers CM are disposed on diagonals of the test pattern image, the projection range PA on the curtain CT can easily be recognized.

In addition, in the above embodiment, the test pattern images include a combination of a plurality of sets of test pattern images for shape correction and color correction of a projection image. Thus, in particular, even when a curtain or the like, which has irregularities and a color pattern, is the projection target, the image can be projected with fidelity to original image signals by correcting the irregularities and color pattern.

In particular, as described with reference to FIG. 4A, FIG. 4B, FIG. 6A and FIG. 6B, use is made of the test pattern image in which the white rectangular image parts with highest gradation of RGB primary color components and the black rectangular image parts with lowest gradation of RGB primary color components are arranged in a checkerboard pattern. Thereby, intersection portions at which light/dark inversion occurs in the xy coordinates can easily and exactly detected from the photographed images.

The above embodiment is applied to the projector apparatus 10 including the projection unit 17 which projects images. Even without attaching any external control equipment, correction conforming to a projection target can be executed more easily by simply connecting a digital camera or the like for image photography.

On the other hand, the embodiment can similarly be realized by an application program which is executed not in the main body of the projector apparatus 10 that performs the projection operation, but in a data processing terminal such as a personal computer connected to the projector apparatus 10, or in an external server apparatus connected to a network via the projector apparatus 10, personal computer or the like.

Besides, the present invention is not limited to the above-described embodiment, and can be variously modified without departing from the scope of the present invention in practical stages.

The embodiments may be appropriately combined as much as possible and practiced and, in this case, the combined advantageous effects can be obtained.

Furthermore, the above-described embodiment incorporates inventions of various stages, and various inventions can be extracted by appropriate combinations of the disclosed constituent elements.

For example, even if some constituent elements are omitted from all the constituent elements disclosed in the embodiment, a configuration from which some constituent elements are omitted can be extracted as an invention if the problem described in the specification is solved and the advantageous effects described in the specification can be obtained.

What is claimed is:

1. A projection system comprising:
   a projector configured to project, from a first direction onto a projection target, a first image for use in detection of undulations of the projection target, the first image being configured such that a first number of first marker images for positioning are arranged at predetermined first positions in the first image;
   an imaging device configured to capture, from a second direction which is different from the first direction, a captured image of the projection target onto which the first image is projected; and
   a controller configured to, in response to determining that a predetermined number of the first marker images for positioning cannot be detected from the captured image, control the projector to project, as an image replacing the first image, a second image in which no marker images for positioning are arranged at the first positions and a second number of second marker images for positioning are arranged at second positions which are different from the first positions, the second number of the second marker images being greater than the first number of the first marker images.

2. The projection system of claim 1, wherein the predetermined first positions include at least one diagonal corner of the first image.

3. The projection system of claim 2, wherein the first marker images are arranged in a pattern which enables distinction of a projection direction of the first image.

4. The projection system of claim 1, wherein the first marker images are arranged in a pattern which enables distinction of a projection direction of the first image.

5. The projection system of claim 1, wherein the controller is configured to control the projector to project, as images corresponding to the first image, at least two images at different times, the at least two images being images of patterns which are different from each other in fineness.

6. The projection system of claim 5, wherein the imaging device is configured to capture the captured image for each of the at least two images.

7. The projection system of claim 1, wherein the controller is configured to detect the undulations of the projection target based on the captured image in response to determining that the predetermined number of the first marker images for positioning can be detected from the captured image, and control the projector to project a third image suited to the detected undulations onto the projection target.

8. The projection system of claim 1, wherein the first image is one of a plurality of images of a first test pattern image system.

9. The projection system of claim 8, wherein the second image is one of a plurality of images of a second test pattern image system different from the first test pattern image system.

10. A projection system comprising:
    a projector configured to project, from a first direction onto a projection target, a first image for use in detection of color distribution of the projection target, the first image being configured such that a first number of first marker images for positioning are arranged at predetermined first positions in the first image;
    an imaging device configured to capture, from a second direction which is different from the first direction, a captured image of the projection target onto which the first image is projected; and
    a controller configured to, in response to determining that a predetermined number of the first marker images for positioning cannot be detected from the captured image, control the projector to project, as an image replacing the first image, a second image in which no marker images for positioning are arranged at the first positions and a second number of second marker images for positioning are arranged at second positions which are different from the first positions, the second number of the second marker images being greater than the first number of the first marker images.

11. The projection system of claim 10, wherein the controller is configured to control the projector to project, as images corresponding to the first image, at least two images at different times, the at least two images being images of patterns which are different from each other in luminance.

12. The projection system of claim 11, wherein the imaging device is configured to capture the captured image for each of the at least two images.

13. The projection system of claim 10, wherein the controller is configured to detect the color distribution of the projection target based on the captured image in response to determining that the predetermined number of the first marker images for positioning can be detected from the captured image, and control the projector to project a third image suited to the detected color distribution onto the projection target.

14. The projection system of claim 10, wherein the first image is one of a plurality of images of a first test pattern image system.

15. The projection system of claim 14, wherein the second image is one of a plurality of images of a second test pattern image system different from the first test pattern image system.

16. A projection system comprising:
- a projector configured to project, from a first direction onto a projection target, a first test pattern image, the first test pattern image being one of a plurality of test pattern images of a first test pattern image system, and all of the plurality of test pattern images of the first test pattern image system including a same first number of marker images for positioning arranged at same predetermined first positions;
- an imaging device configured to capture, from a second direction which is different from the first direction, a captured image of the projection target onto which the first test pattern image is projected;
- a controller configured to:
    - in response to determining that a predetermined number of the first marker images for positioning cannot be detected from the captured image, control the projector to project, onto the projection target instead of the first test pattern image, a second test pattern image, the second test pattern image being one of a plurality of test pattern images of a second test pattern image system, and all of the plurality of test pattern images of the second test pattern image system including a same second number of marker images for positioning arranged at same predetermined second positions, the second number being greater than the first number, and none of the second positions coinciding with any of the first positions; and
    - in response to determining that the predetermined number of the first marker images for positioning can be detected from the captured image, detect an attribute of the projection target based on the captured image, and control the projector to project a third image suited to the detected attribute onto the projection target.

* * * * *